United States Patent
Weiser et al.

[11] Patent Number: 6,141,418
[45] Date of Patent: Oct. 31, 2000

[54] ERGONOMIC TELEPHONE HEADSET AMPLIFIER UNIT

[75] Inventors: Isaac Weiser; Margaret Weiser, both of Tarzana, Calif.

[73] Assignee: Smith Corona Corp., Cortland, N.Y.

[21] Appl. No.: 09/163,773

[22] Filed: Sep. 30, 1998

[51] Int. Cl.[7] ...................................................... H04M 1/00
[52] U.S. Cl. ........................................... 379/454; 379/420
[58] Field of Search ..................................... 379/428, 435, 379/420, 454, 455, 446, 447

[56] References Cited

U.S. PATENT DOCUMENTS

| | | | |
|---|---|---|---|
| D. 326,267 | 5/1992 | Weiser | 379/440 |
| 4,104,485 | 8/1978 | Pessel et al. | 179/1 HF |
| 4,191,861 | 3/1980 | Walker | 179/81 B |
| 4,763,352 | 8/1988 | Goff | 379/145 |
| 4,800,438 | 1/1989 | Yuter | 358/254 |
| 4,864,601 | 9/1989 | Berry | 379/96 |
| 4,885,773 | 12/1989 | Stottlemyer | 379/420 |
| 4,930,156 | 5/1990 | Norris | 379/388 |
| 4,962,528 | 10/1990 | Herrera | 379/442 |
| 5,185,789 | 2/1993 | Hanon et al. | 379/395 |
| 5,229,721 | 7/1993 | Stade | 330/265 |
| 5,440,628 | 8/1995 | Mile | 379/435 |
| 5,729,603 | 3/1998 | Huddart | 379/387 |

*Primary Examiner*—Jack Chiang
*Attorney, Agent, or Firm*—George R. McGuire; Hancock & Estabrook, LLP

[57] ABSTRACT

A housing for a telephonic electronic component, such as a telephone headset amplifier, adapted to be positioned in supporting relation beneath a standard, desktop telephone. The housing generally includes a base unit that sits flush on a desktop, and an upper unit that is positioned in covering relation to the base unit, with an enclosed cavity being defined between the base and upper units. The upper unit includes an inclined, upwardly facing surface on which a telephone may be positioned, and a control panel extending across the entire width of the unit's leading edge. The control panel extends upwardly and outwardly from the upwardly facing surface, thereby defining a lip across the interface between the surface and control panel. The lip serves as an abutment which prevents the telephone from sliding off of the unit. Additional features of the present invention include a telephone handset lift-off assembly, and an on-line indicator assembly that extends a predetermined distance outwardly, and preferably upwardly, from the base unit.

20 Claims, 5 Drawing Sheets

ERGONOMIC TELEPHONE HEADSET AMPLIFIER UNIT

BACKGROUND OF THE INVENTION

The present invention generally relates to housings for telephonic electronic components, such as headset amplifiers, and more particularly, to a space-saving housing positioned in supporting relation beneath a conventional, desktop telephone. Although various types of telephonic electronic components could be stored in the housing of the present invention, for purposes of simplicity and preferred mode, a headset amplifier will be the electronic component referred to throughout.

Traditionally, use of a telephone required that the user thereof hold a handset in proximity to the side of his or her head, thereby limiting the user's mobility by requiring his or her arm and head to be constantly, cooperatively positioned with respect to one another. For this reason, in an occupation that requires a person to frequently conduct business over the telephone, the traditional handset is burdensome. As a solution to this problem, telephone headsets were invented and developed.

A telephone headset replaces the conventional handset by providing the earpiece and microphone on an apparatus that is easily mounted to one's head. The headsets typically include a U-shaped band that may be securely mounted atop one's head, and includes an earpiece attached to at least one of its two terminal ends, and a microphone mounted at the distal end of a boom that extends from the U-shaped bracket. An electrical connector extends between the telephone base and the headset to conduct the incoming and outgoing sound between them. Due to a weakening of the incoming and outgoing sound signals between the headset and telephone, an amplifier unit is generally connected in series between them. In addition to amplifying the signal, the amplifier permits the user to eliminate any audible feed back, selectively control the level of the incoming and outgoing sound, choose between using the headset or conventional handset, and control the balance between the sound received through the two earpieces, among other things.

While the headset enhances the user's versatility and mobility, it adds cumbersome wires and the amplifier housing takes up space on the user's workspace. In workplaces where it is necessary to conserve space, the use of a headset system is either not used or requires that other things not be used due to its space requirements.

It is therefore a principal object and advantage of the present invention to provide a telephone headset amplifier housing that may be positioned in supporting relation beneath a conventional, desk top telephone, thereby requiring essentially no more desk top space than is needed to support the telephone.

It is a further object and advantage of the present invention to provide a telephone headset amplifier unit that includes an ergonomic user control panel.

It is an additional object and advantage of the present invention to provide a telephone headset amplifier housing having a selectively adjustable platform on which a telephone may be placed.

Other objects and advantages of the present invention will in part be obvious, and in part appear hereinafter.

SUMMARY OF THE INVENTION

In accordance with the foregoing objects and advantages, the present invention provides a telephone headset amplifier unit generally comprised of a housing having a planar, bottom surface suitable for securely resting atop a planar desktop, an upwardly facing surface on which a conventional, desktop phone may be positioned and that extends in an inclined first plane which intersects the plane of the bottom surface, a plurality of sidewalls which bridge the upwardly facing and bottom surfaces, and a control panel that extends in an inclined second plane, which may be inclined at a greater angle than the first plane, thereby intersecting both the first plane and the bottom surface's plane, and is positioned adjacent the upwardly facing surface's leading edge. A vertically extending lip extends transversely across the upwardly facing surface's leading edge and provides an abutment surface that prevents the conventional telephone from sliding off of the amplifier unit, and forms the interface between the upwardly facing surface and the control panel.

Enclosed within the housing is conventional amplifier circuitry, conventional on-line indicator circuitry, and an LED that is actuated when a user is speaking on the phone, and hence, when the amplifier (and headset) are in use. The LED embedded in the housing emits light which is sent through a conventional light pipe that extends outwardly from the housing. The light pipe terminates in a lens that emits the light generated by the LED. Therefore, when a user is speaking on the phone, the lens will emit light, thereby alerting others in the vicinity that a particular person is on the phone. In addition, the light pipe may include a U-shaped, wire bracket on which a user may rest his or her headset when it is not in use.

The control panel includes standard user controls, such as an HFB control key, a voice level control button, balance control, a mute key, and a handset/headset toggle button. The control panel may be either integrally molded to the upwardly facing surface, or is removably mounted to the amplifier housing via snap-fit clips which engage cooperatively positioned slots formed in the housing, thereby permitting the control panel to be updated, repaired or replaced without having to replace the entire system.

A further feature that may be included with the unit is a handset lifting device which is manually operable to lift and hold the telephone's handset off the hook. As it is necessary for the handset to be "off the hook" when operating with a headset, the lift-off device eliminates the need to lay the handset on the desktop, and thereby take up additional work space. The handset lifting assembly is securely mounted to one of the housing's sidewalls, and includes a rotatable lever which extends in vertically spaced relation above the upwardly facing surface, such that it may be positioned in supporting relation beneath a handset of a telephone positioned atop the housing. By manually rotating the lever, via a handle, the lever lifts the handset off the receiver, thereby opening the channel for communications between the headset and telephone.

BRIEF DESCRIPTION OF THE DRAWINGS

The present invention will be more fully understood by reading the following Detailed Description in conjunction with the accompanying drawings, in which.

DETAILED DESCRIPTION

Figure 3:
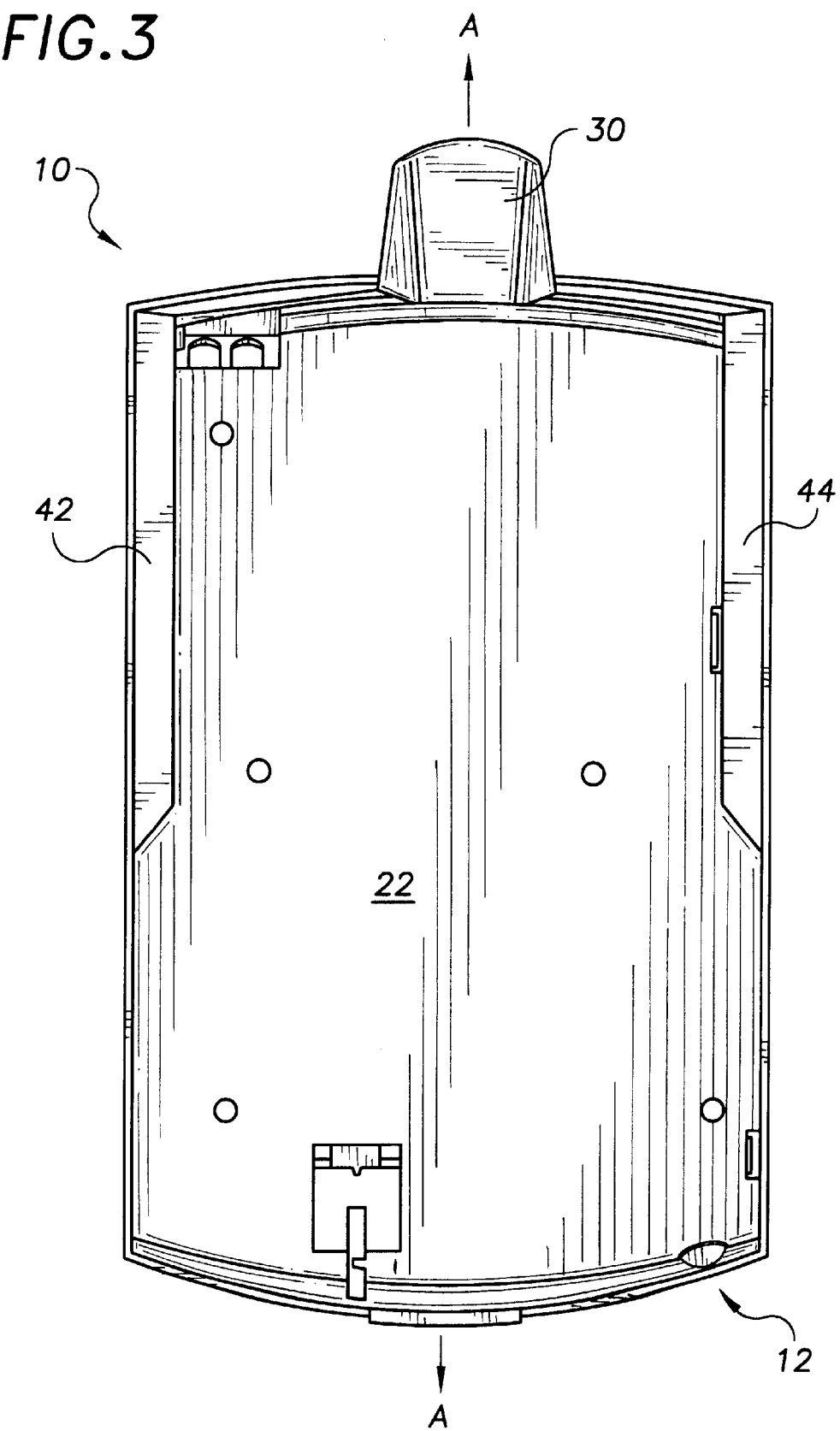
FIG. 3 is a bottom plan view thereof.

Referring now to the drawings, wherein like reference numerals refer to like parts throughout, there is seen in each of the Figures, a telephone headset amplifier housing, denoted generally by reference numeral 10, which extends along a longitudinal axis A—A (see FIG. 3). Amplifier housing 10 generally includes a base unit, denoted generally 12, an upper unit, denoted generally 14, positioned in covering relation to base unit 12, a light pipe assembly, denoted generally 16, extending outwardly, and preferably upwardly, from base unit 12 and upper unit 14, and a handset lifting assembly, denoted generally by reference numeral 18, removably attached to upper unit 14. Base unit 12 and upper unit 14 cooperatively define an internal cavity 20 in which conventional amplifier circuitry (not shown) may be positioned.

Base unit 12 includes a planar, bottom surface 22 which extends in a first plane, P1, that is co-planer with the upper surface of a desktop when in use, a pair of sidewalls 24, 26, a front wall 28 and a rear wall 30, all of which extend upwardly from bottom surface 22. The middle section of rear wall 30 includes a light emitting diode ("LED") housing 32 which integrally extends outwardly from wall 30. LED housing 30 includes two connectors 32, 34 for receiving a pair of LEDs 36, 38, respectively, and electrically connecting them to a power source, such as a battery pack or AC/DC power supply (neither shown). While two LEDs are illustrated, it should be understood that a single LED would emit sufficient light for the intended purpose.

Upper unit 14 generally includes a planar, upwardly facing surface 40, and a pair of sidewalls 42, 44 and a rear wall 46 extending downwardly therefrom, and a control panel 48 extending upwardly and outwardly therefrom. When housing 10 is assembled, sidewalls 42, 44 overlap and rest upon sidewalls 24, 26. The upward and outward extension of control panel 48 from surface 40, provides an abutment lip 50 extending along the entire width of the control panel/upwardly facing surface interface, which prevents a telephone from sliding off of surface 40 and interfering with operation of the control panel. An opening 52 is formed centrally through upwardly facing surface 40 and includes a bracket 54 positioned in vertically spaced relation therebelow which receives and retains the power source (e.g., battery pack which is not shown). A cover plate 56 is provided to be snap-fit in co-planar relation to surface 40, and in covering relation to opening 52.

Figure 5:
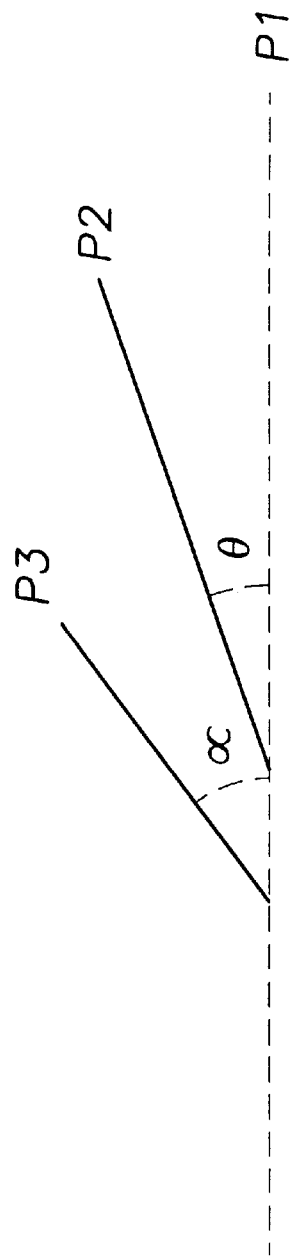
FIG. 5 is a graphical representation of the intersecting nature of the various planar surfaces.

With reference to FIG. 5, upwardly facing surface 40 extends in a plane, P2, that is inclined at a predetermined angle ⊖ with respect to the horizontal plane, P1, in which bottom surface 22 extends. Control panel 48 extends in a plane, P3, that is inclined at a predetermined angle , which may be greater than angle ⊖, with respect to the horizontal plane, P1, in which bottom surface 22 extends. The incline at which upwardly facing surface 40 extends is suitable for maintaining a conventional, desk top phone at an easily manipulable angle for its user, while control panel 48 extends at a preferred, ergonomically correct angle for the user to manipulate the various control buttons 58 (e.g., HFB control, outgoing and incoming voice level control, balance control) positioned thereon, each of which is electrically connected to standard amplifier circuitry (not shown) embedded in housing 10.

Upper unit 14 further includes an LED cover 59 that integrally extends outwardly from rear wall 46. When housing 10 is fully assembled with upper unit 14 positioned in covering relation to base unit 12, cover 50 is positioned in covering relation to LED housing 30. An opening 61 is formed through cover 59 so as to permit light pipe assembly 16 to extend therethrough.

Figure 1:
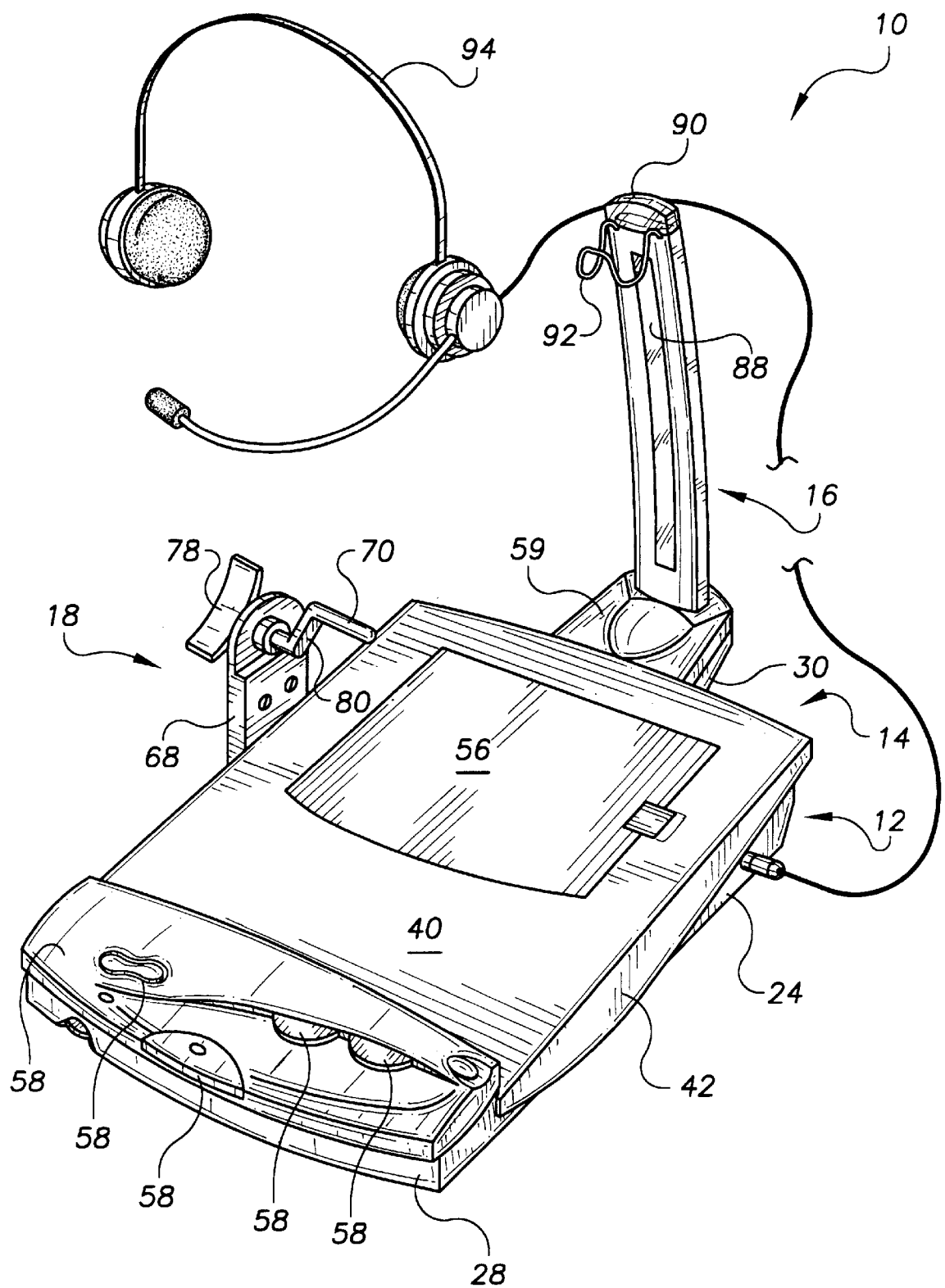
FIG. 1 is a perspective view of the present invention.
Figure 2:
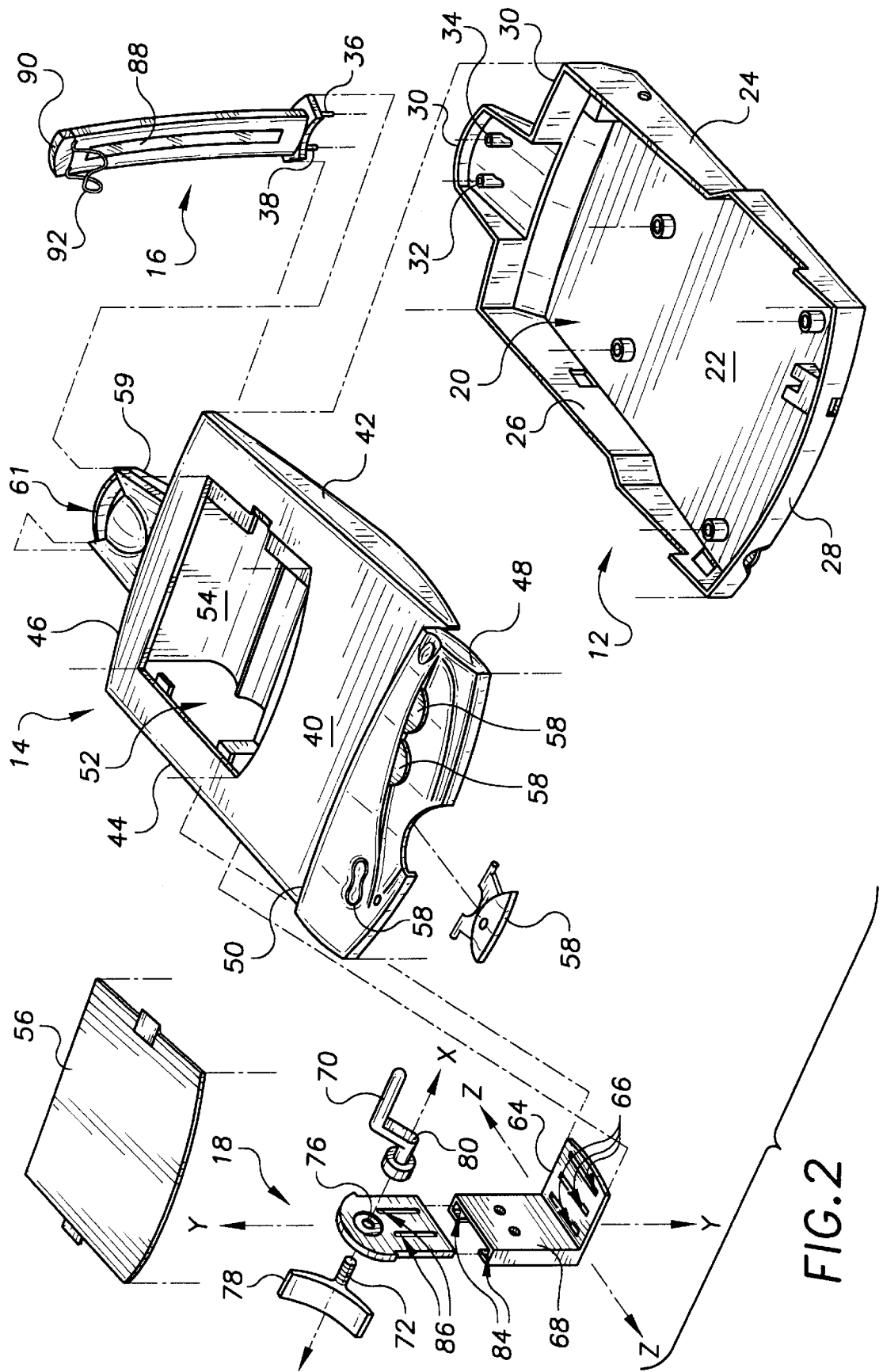
FIG. 2 is an exploded perspective view thereof.
Figure 4:
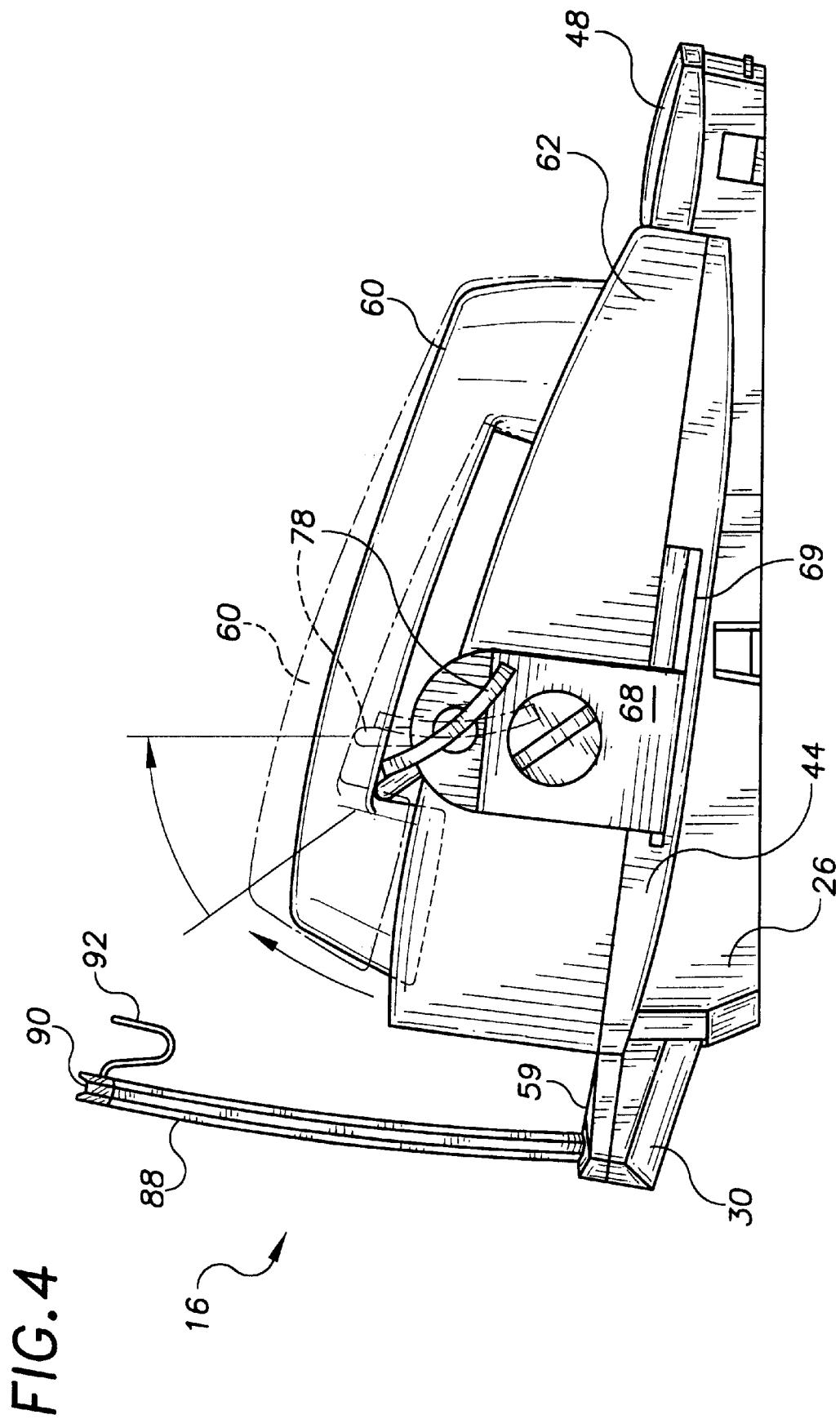
FIG. 4 is a left side elevational view of the present invention showing the operation of the handset lift-off assembly.

An additional feature that may be incorporated into the present invention is the handset lift-off assembly, denoted generally by reference numeral 18, which provides a means for maintaining and holding the handset 60 of a phone 62 (see FIG. 4) off the receiver which is necessary when using a headset to communicate via phone 62. Lift-off assembly 18 includes a bracket 64 having a plurality of spaced, parallel slots 66 formed therethrough, and which extends inwardly from the bottom edge of a main body portion 68, and connects to housing 10 through an elongated slot 69 formed through sidewall 44. A lever 70 includes a threaded boss 72 which receives a threaded shaft 74 that freely extends through an aperture 76 formed through body portion 68 and is integrally connected to a handle 78, thereby interconnecting handle 78 to lever 70. Lever 70 is intended to be positioned in contacting relation to and under the ear piece of handset 60, as illustrated in FIG. 4. Due to the offset shaft 80 that integrally extends between lever 70 and boss 72, a user grasping and rotating handle 78 about its radial axis X—X (see FIG. 2) will cause lever 70 to lift or descend handset 60 off of, or onto its receiver, respectively. In order to accommodate phones of different sizes, the upper end 82 of assembly 18 to which lever 70 is attached, is vertically, slidably adjustable within channels 84 formed in body 68. Also, assembly 18 is laterally, slidably adjustable along axis Y—Y (see FIG. 2) within slots 86, and is slidably adjustable along axis Z—Z (see FIG. 2) by connecting it to housing 10 at various of slots 66.

As illustrated in the Figures, one further feature that may be included in the present invention is an in-use indicator assembly, denoted generally by reference numeral 16, which emits light generated by at least one of LEDs 36, 38 positioned within LED housing 30 when it is in use, thereby alerting others in the vicinity of housing 10 that the person using it is on the phone. LEDs 36, 38 are electrically connected to standard circuitry so as to become actuated when the headset assembly is in use. Examples of standard circuitry are disclosed in U.S. Pat. No. 5,608,797 to Larsen et al; U.S. Pat. No. 3,451,248 to Feiner et al; and U.S. Pat. No. 5,210,791 to Krasik, which are incorporated herein by reference. The light generated by LEDs 36, 38 is sent through a light pipe 88 which extends outwardly, and preferably upwardly, from LED housing 30 and through opening 61 formed through LED cover 59. A lens 90, securely attached to the distal end of light pipe 88. emits the light generated by LEDs 36, 38.

A generally U-shaped headset hanger 92 is attached at the upper end of assembly 16. When not in use, a user may set his or her headset 94 on hanger 92 so as to not take up and clutter any desk space.

What is claimed is:

1. A housing for a telephonic electronic component adapted for positioning in supporting relation beneath a conventional, desk top telephone, comprising:

a) a base unit having a bottom surface that extends in a first plane, first and second sidewalls and a rear wall extending upwardly therefrom, said bottom surface, first and second sidewalls and rear wall collectively defining a cavity;

b) an upper unit positioned in covering relation to said base unit, and including a telephone supporting, upwardly facing surface extending in a second plane that is inclined at a first predetermined angle with respect to said first plane, and lies in intersecting relation to said first plane, and a control panel attached to said upwardly facing surface and extending in a third plane that is inclined at a second predetermined angle with respect to said first plane, and lies in intersecting relation to said first and second planes, said upwardly facing surface and bottom surface being positioned in spaced relation to one another; and c) means for preventing said telephone from sliding off of said upwardly facing surface.

2. The housing according to claim 1, wherein said means for preventing said telephone from sliding off of said upwardly facing surface includes said control panel and said upwardly facing surface including a common, longitudinal edge, said edge forming an abutment against which said telephone may bear.

3. The housing according to claim 1, wherein said upwardly facing surface includes an opening formed centrally therethrough and a bracket attached thereto and extending outwardly from said opening.

4. The housing according to claim 3, and further comprising a plate removably attached to said upwardly facing surface in covering relation to said opening, whereby removal of said plate from said upwardly facing surface provides access to said bracket.

5. The housing according to claim 1, and further comprising means for indicating the on-line operating status of said electronic components.

6. The housing according to claim 5, wherein said on-line indicating means includes at least one light emitting diode operably positioned within said cavity.

7. The housing according to claim 6, wherein said at least one diode is positioned adjacent said rear wall.

8. The housing according to claim 7, and further comprising an elongated light pipe having proximal and distal ends and extending outwardly from said base unit and positioned adjacent said rear wall.

9. The housing according to claim 8, wherein said light emitting diode is positioned adjacent said proximal end of said light pipe, whereby light emitted from said light emitting diode will enter said light pipe.

10. The housing according to claim 9, wherein said light pipe includes a lens attached thereto at its said distal end, whereby light emitted from said light emitting diode is ultimately emitted through said lens.

11. The housing according to claim 1, and further comprising means for maintaining the handset of said telephone off the receiver.

12. The housing according to claim 11, wherein said means for maintaining the handset of said telephone off the receiver is a lift-off assembly comprised of:
   a) a body portion attached to said base unit;
   b) an elongated lever extending a predetermined length outwardly from and being rotatably connected to said body portion, said predetermined length being sufficient to position said lever in engaging relation to said handset; and
   c) a handle securely attached to said lever and selectively, manually manipulable to rotate said lever, whereby said lever will raise or lower said handset off of or onto said receiver, respectively.

13. A housing for a telephonic electronic component adapted for positioning in supporting relation beneath a conventional, desk top telephone, comprising:
   a) a base unit having a bottom surface that extends in a first plane, first and second sidewalls and a rear wall extending upwardly therefrom, said bottom surface, first and second sidewalls and rear wall collectively defining a cavity;
   b) an upper unit positioned in covering relation to said base unit, and including a telephone supporting, upwardly facing surface extending in a second plane that is inclined at a first predetermined angle with respect to said first plane, and lies in intersecting relation to said first plane, and a control panel attached to said upwardly facing surface and extending in a third plane that is inclined at a second predetermined angle with respect to said first plane, and lies in intersecting relation to said first and second planes, said upwardly facing surface and bottom surface being positioned in spaced relation to one another; and
   c) means for indicating the on-line operating status of said electronic component.

14. The housing according to claim 13, wherein said on-line indicating means includes at least one light emitting diode operably positioned within said cavity.

15. The housing according to claim 14, wherein said at least one diode is positioned adjacent said rear wall.

16. The housing according to claim 15, and further comprising an elongated light pipe having proximal and distal ends and extending outwardly from said base unit and positioned adjacent said rear wall.

17. The housing according to claim 16, wherein said light emitting diode is positioned adjacent said proximal end of said light pipe, whereby light emitted from said light emitting diode will enter said light pipe.

18. The housing according to claim 17, wherein said light pipe includes a lens attached thereto at its said distal end, whereby light emitted from said light emitting diode is ultimately emitted through said lens.

19. A housing for a telephonic electronic component adapted for positioning in supporting relation beneath a conventional, desk top telephone, comprising:
   a) a base unit having a bottom surface that extends in a first plane, first and second sidewalls and a rear wall extending upwardly therefrom, said bottom surface, first and second sidewalls and rear wall collectively defining a cavity;
   b) an upper unit positioned in covering relation to said base unit, and including a telephone supporting, upwardly facing surface extending in a second plane that is inclined at a first predetermined angle with respect to said first plane, and lies in intersecting relation to said first plane, and a control panel attached to said upwardly facing surface and extending in a third plane that is inclined at a second predetermined angle with respect to said first plane, and lies in intersecting relation to said first and second planes, said upwardly facing surface and bottom surface being positioned in spaced relation to one another; and
   c) means for maintaining the handset of said telephone off of the receiver.

20. The housing according to claim 19, wherein said means for maintaining the handset of said telephone off the receiver is a lift-off assembly comprised of:
   a) a body portion attached to said base unit;
   b) an elongated lever extending a predetermined length outwardly from and being rotatably connected to said body portion, said predetermined length being sufficient to position said lever in engaging relation to said handset; and
   c) a handle securely attached to said lever and selectively, manually manipulable to rotate said lever, whereby said lever will raise or lower said handset off of or onto said receiver, respectively.

* * * * *